C. C. THOMAS.
APPARATUS FOR COOLING WATER AND OTHER LIQUIDS.
APPLICATION FILED SEPT. 14, 1915.

1,225,889.

Patented May 15, 1917.
2 SHEETS—SHEET 1.

Witnesses:
F. C. Walsh
E. G. Nelson

Inventor:
Carl C. Thomas

C. C. THOMAS.
APPARATUS FOR COOLING WATER AND OTHER LIQUIDS.
APPLICATION FILED SEPT. 14, 1915.

1,225,889. Patented May 15, 1917.
2 SHEETS—SHEET 2.

UNITED STATES PATENT OFFICE.

CARL C. THOMAS, OF BALTIMORE, MARYLAND.

APPARATUS FOR COOLING WATER AND OTHER LIQUIDS.

1,225,889.

Specification of Letters Patent.   Patented May 15, 1917.

Application filed September 14, 1915.   Serial No. 50,697.

*To all whom it may concern:*

Be it known that I, CARL C. THOMAS, of the city of Baltimore, State of Maryland, have invented certain new and useful Improvements in Apparatus for Cooling Water and other Liquids, of which invention the following is a full and complete description.

My invention relates to those means of lowering the temperature of water and other liquids, known as cooling ponds, and consists in certain novel means of bringing the liquid into effective contact with the surrounding air, and of increasing the length of time during which such contact takes place before the water is allowed to fall into the pond.

The objects of my invention are to provide an improved means for cooling water by contact with flowing currents of air; to obtain higher cooling efficiency; to make the apparatus compact, simple and relatively inexpensive; to avoid the water-dispersing effect of wind acting upon spray; to produce air circulation over and through the water to be cooled by direct thermal action and without the necessary use of air-forcing means; and generally to produce an apparatus which, while very simple and compact, is of very high efficiency and great durability, and which may be used in large or small units as desired.

I will now proceed to describe my invention with reference to the accompanying drawings and will then point out the novel features in claims:

Figure 1:
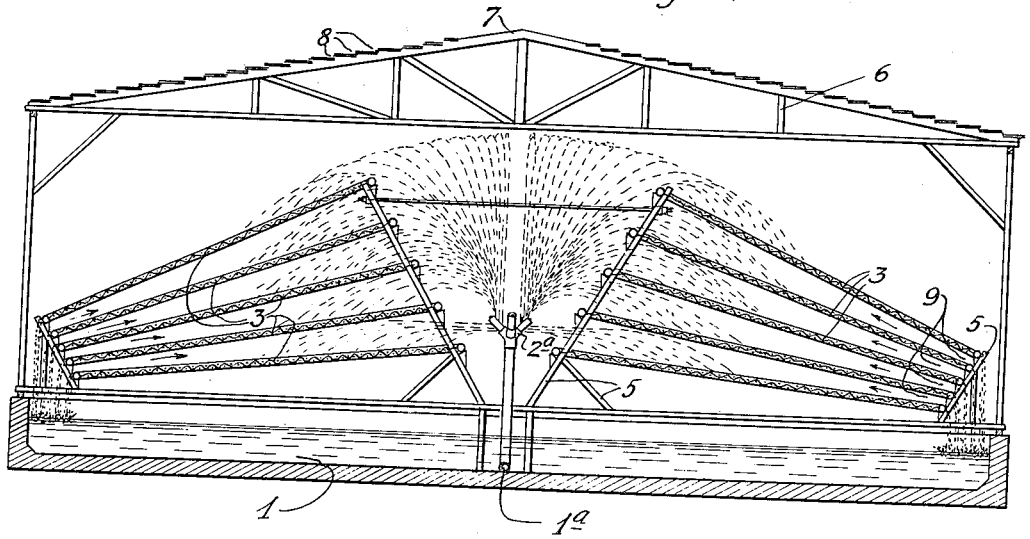
Figure 1 shows a central vertical section of one form of air cooling apparatus embodying my invention.

The means by which the water is now cooled in large quantities, in engineering practice, include cooling ponds and cooling towers. In cooling ponds water is sprayed into the air above a reservoir, and contact of the finely divided water with the air results in cooling of the water by convection of heat from water to air during direct contact with the air, and also as a result of the evaporation of part of the sprayed water. The extent of the cooling depends upon several factors, including atmospheric conditions, the fineness with which the spray is divided, the length of time it remains in the air, and the velocity with which the surrounding air is moving with respect to the spray of water. Properly constructed nozzles and means for exerting pressure on the water are essential to success in cooling water by this method.

A cooling tower consists of a structure somewhat like a large chimney, but usually rectangular in cross section, having vertical sides either open or closed but generally closed, openings at the base for inlet of air and an opening at the top for outlet of air, one or more pipes leading to the top of the tower for delivering the warm water so that it may drop over or through obstructions, in the form of trays or timbers or the like, within the tower, and a reservoir below into which the cooled water may fall. Air currents are produced in the tower either by natural or forced draft.

In my cooling pond apparatus the water is finely divided by spraying from a suitable nozzle or group of nozzles, and instead of passing directly from the spray into the pond below, it is caused to descend upon screens or trays of suitable materials such as canvas, impregnated fabric, etc., arranged in the form of inclined surfaces, of which there are usually a number located one above another with space between for the flow of air as well as for the raining down of the spray upon such surfaces; upon which surfaces the water spreads out into a thin film and is caused to travel by gravity toward the lower end of said screens and to come into surface contact with air currents traveling upward between the screens in a direction opposite, or counter to that in which the film of water is moving. The air current is produced by reason of the higher temperature of the spray entering the upper ends of the trays as compared with the lower temperature of the water and vapor at the lower ends of the trays. This difference of temperature is produced by the gradual cooling of the water by direct contact with the ascending current of air between the screens, which cools the film of water by both convection of heat from water to air, and by evaporation. In order to provide for the larger volume of the air at the upper ends of the screens as compared with that of the cooler air at the lower ends, I customarily separate the screens, or trays, more widely apart at the upper end than at the lower, as shown in the accompanying drawings.

I find it is desirable in some cases to place a louver or open-work shade or roof over such a spray system in order to keep the direct rays of the sun from the apparatus; and I find also that in some cases, especially where the water pressure available for spraying is small, it is desirable to arrange a wide-mesh screen of wire or other suitable material between the spray and the entrance to the screens, in order that the spray may be more finely divided and evenly spread over the screens, or trays than would otherwise be the case. I use the term wide-mesh in the above description as signifying any width of mesh greater than that of such woven fabric as canvas, cloth, etc.

It is the purpose of the screens or trays described to support the film of water during its descent and to prevent this film from falling through the material of the screen or tray, or from being absorbed by it. For example, I find that a closely woven canvas accomplishes this end and effects satisfactory cooling to a greater extent than does such soft material as cheese-cloth, burlap, etc.

In Fig. 1, I have shown in cross-section a pond 1 fitted with supply pipes, 1ª leading to a group of spray nozzles, 2ª which discharge a spray in such direction that it tends to enter the spaces between the inclined screens or trays, 3 or to fall upon them. These trays or screens, 3 are made in the shape of superposed truncated cones, grouped centrally about the spray nozzles. These trays are supported by a suitable framework, 5 which may be made of pipe and fittings, or of wood or other suitable material. The material of the screens or trays may be supported by a series of cross wires, as shown, and may be either flat or slightly corrugated according to the method adopted for supporting the material.

The spray nozzles and system of trays or screens may be protected from the direct rays of the sun by a louver roof, 8, provided with one or more openings, 7, for the escape of air from above the sprays. This roof may be strengthened by truss members, 6 according to engineering practice.

The spray entering at the upper or inner edges of the conical screens, 3, is spread out into films of water and is brought into contact with air currents passing in the direction of the arrows between the screens, the water being cooled as heretofore described and dripping from the outer edges of the conical screens into the pond below.

Figure 3:
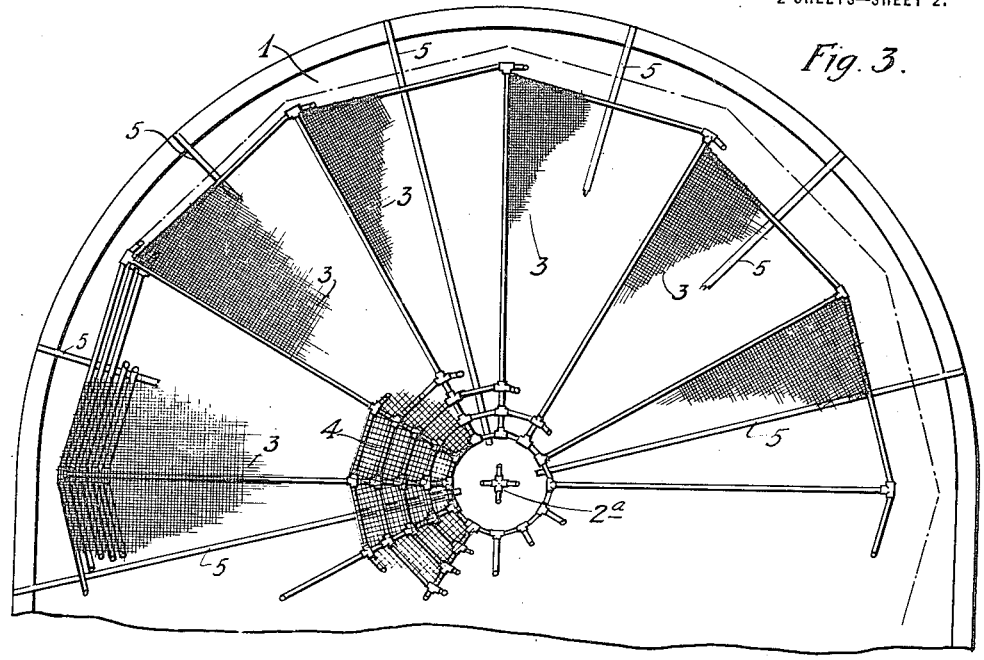
Fig. 3 shows a fragmentary plan view of the apparatus shown in Fig. 1, the roof shown in Fig. 1 being omitted in Fig. 3.

Fig. 3 shows a partial plan of this arrangement and includes also a partial view of a conical screen, 4, of wide mesh, which has been mentioned above, as desirable in cases where the pressure available for spraying is not great enough to finely divide the water and sufficiently distribute it over the inlets to the screens, 3.

Figure 2:
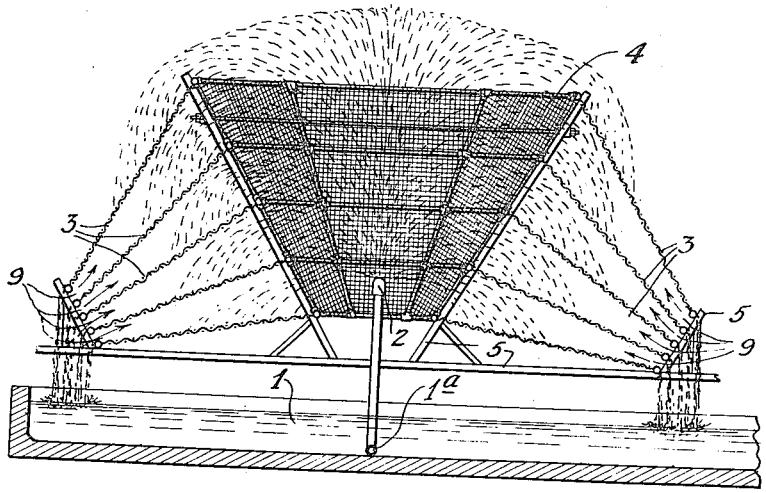
Fig. 2 shows a similar view of an alternative form of apparatus.

Fig. 2 shows a cross-section through an apparatus similar to the one first described, and including the end screen, 4.

Figure 4:
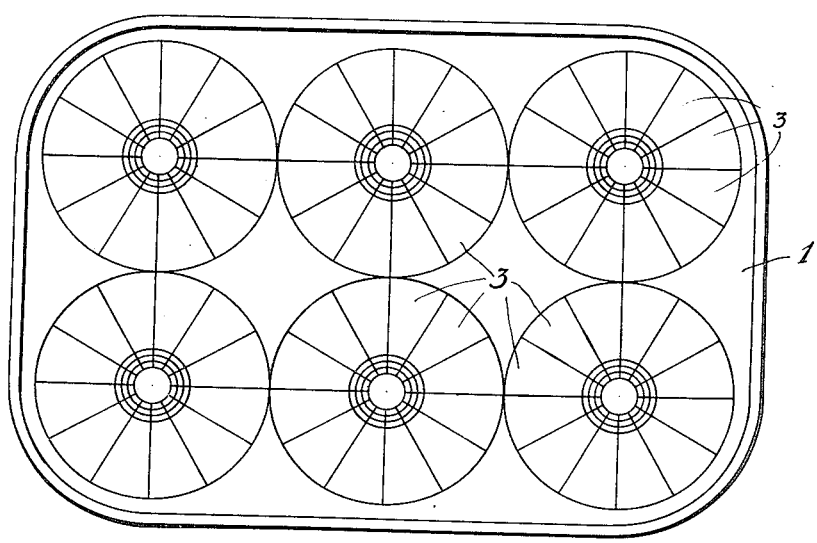
Fig. 4 shows a plan of a large cooling pond, provided with a plurality of sets of spraying devices and screens, such as shown in previous figures.

Fig. 4 shows in plan, a large cooling pond, in which a plurality of sets of nozzles and screens, such as have been heretofore described, are grouped over the surface of a pond so as to provide for cooling a large amount of water.

Fig. 1 shows a plurality of nozzles delivering water into a single set of screens, while Fig. 2 shows a single nozzle, for similar purpose.

I am well aware of the use which is commonly made of trays, screens, timbers, and other obstructions in cooling towers or chimneys, and over reservoirs, and my experience with such arrangements as have heretofore existed, has led me to realize the difficulty of obtaining cooling effect thereby, the chief difficulties being, that the trays and their supports are not arranged suitably for allowing satisfactory ingress and circulation of air with respect to the water; further, the water is not, in such systems, finely enough divided and then spread out into moving films; and finally, both the forced and natural draft towers commonly used are very much more expensive to construct and to maintain in operation, than are such combinations of pond and screens and roof as I have heretofore described.

I have found, after much experience in this art, that such systems as are herein described and claimed, afford an inexpensive means for producing a cooling effect considerably greater in extent than is ordinarily produced by the use of other forms of apparatus now available for the same purpose. The word, inexpensive, is here used in a comparative sense.

A further advantage of my apparatus is that it greatly decreases the loss of water by driftage of the spray during windy weather.

What I claim is:

1. Water cooling apparatus comprising spray producing means and a plurality of inclined water-film supporting means located one above another and arranged around such spray means and adapted to receive the spray therefrom and to permit the flow of water from such spray downward over them in the form of thin films, whereby through transfer of heat between such water films and the air between said inclined film-supporting means air is caused to flow along and in contact with such films.

2. Water cooling apparatus comprising spray producing means and a plurality of inclined water-film supporting means located one above another and arranged around such spray means and adapted to receive the spray therefrom and to permit the flow of water downward in the form of thin films, the space between the said film-supporting means being greater near the center than near the sides of the apparatus.

3. Water cooling apparatus comprising spray producing means and a plurality of inclined water-film supporting means located one above another and arranged around such spray means and adapted to receive the spray therefrom and to permit the flow of water from such spray downward over them in the form of thin films, whereby through transfer of heat between such water films and the air between said inclined film-supporting means air is caused to flow along and in contact with such films, said water film-supporting means having approximately the form of truncated conical surfaces.

4. Water cooling apparatus, comprising spray producing means, and an open-center water-film-supporting means surrounding such spray producing means and adapted to receive the spray therefrom and having approximately the form of a truncated conical surface, whereby through transfer of heat between the water film on such surface and the air above, such air is caused to flow over the water film.

5. Water cooling apparatus comprising spray producing means and a plurality of inclined water-film supporting means located one above another and arranged around such spray means and adapted to receive the spray therefrom and to permit the flow of water downward in the form of thin films, and a screen of wide mesh located at the entrance, near such spray producing means, to the spaces between said water-film supporting means.

6. Water cooling apparatus, consisting of spray-producing means, suitably arranged for discharging upon screens or trays grouped about said spray-producing means, and having the form of truncated conical surfaces one above the other, the vertical space between such surfaces being greater at the upper edges of the cones than at the lower edges.

7. Water cooling apparatus consisting of spray-producing means suitably arranged for discharging upon screens or trays grouped about said spray-producing means, and having the form of truncated conical surfaces, one above the other, and provided with a foraminous screen placed across the upper entrance to the spaces between said truncated conical surfaces.

8. Water cooling apparatus comprising spray-producing means and a plurality of open-center water-film supporting means surrounding such spray-producing means and located one above another and each inclined with respect to the horizontal, the angle of inclination of each upper water film supporting means being greater than that of the water film supporting means beneath, whereby the space between adjacent water film supporting means increases in depth progressively from the outside toward the center, there being space at the outside for the entrance of air between the several water-film supporting means.

9. Water cooling apparatus comprising spray-producing means and a plurality of open-center water-film supporting means surrounding such spray-producing means and located one above another and each inclined with respect to the horizontal, the angle of inclination of each upper water film supporting means being greater than that of the water-film supporting means beneath, whereby the space between adjacent water-film supporting means increases in depth progressively from the outside toward the center, there being space at the outside for the entrance of air between the several water-film supporting means, the central aperture of each upper water film supporting means being larger than that of the water film supporting means beneath, whereby the space within which spray is produced grows progressively wider in an upward direction.

In witness that I claim the foregoing invention I have hereunto subscribed my name this seventh day of September, 1915.

CARL C. THOMAS.

Witnesses:
HARRIET E. PYLE,
R. R. THOMAS.